Nov. 11, 1941.    B. O. AUSTIN    2,262,379
MOTOR CONTROL SYSTEM
Filed July 26, 1940
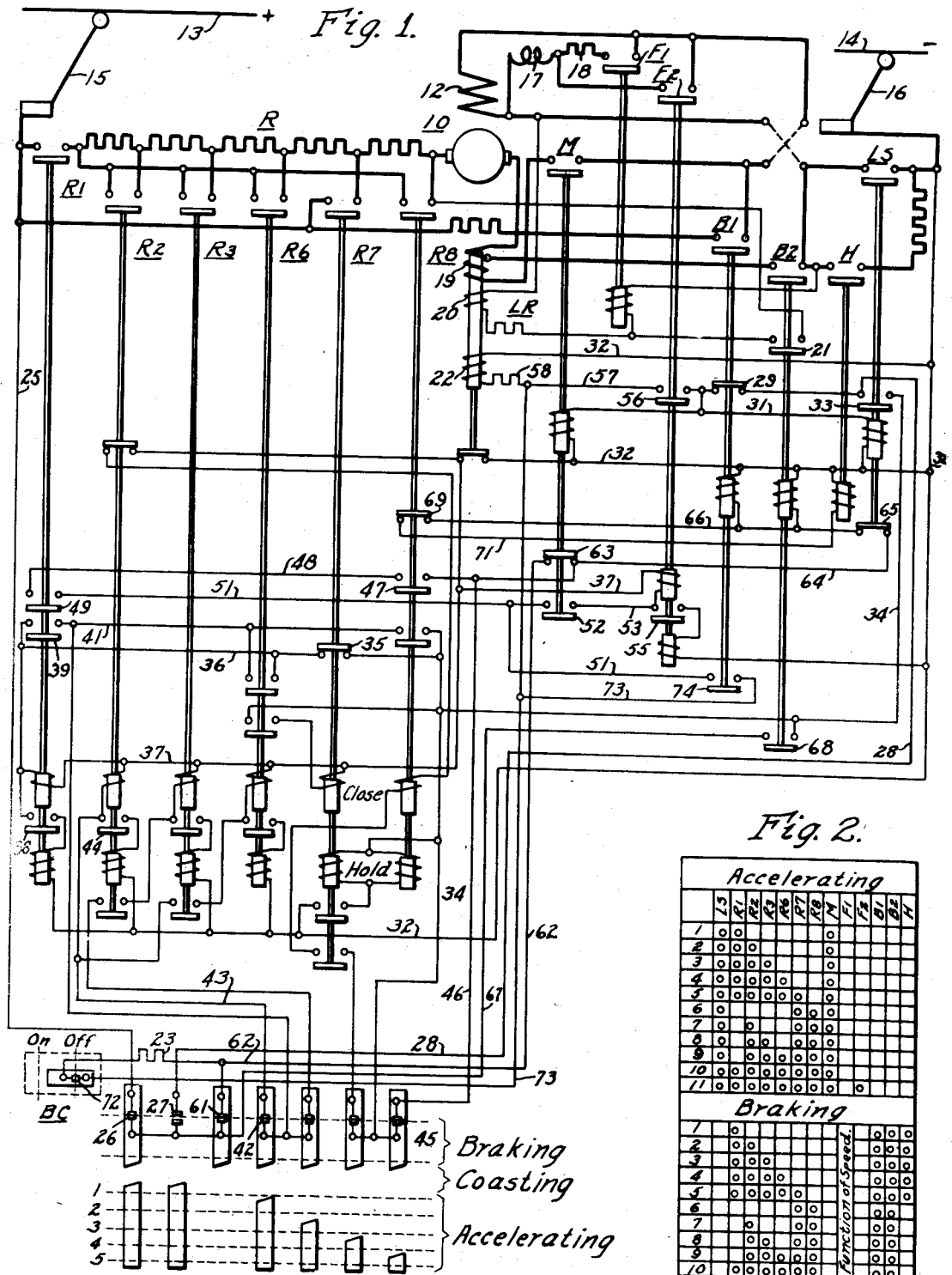

Patented Nov. 11, 1941

2,262,379

UNITED STATES PATENT OFFICE 2,262,379

MOTOR CONTROL SYSTEM

Bascum O. Austin, Forest Hills, Pa., assignor to Westinghouse Electric & Manufacturing Company, East Pittsburgh, Pa., a corporation of Pennsylvania Application July 26, 1940, Serial No. 347,689

7 Claims. (Cl. 172—179)

My invention relates, generally, to motor control systems and, more particularly, to systems for controlling dynamic braking of electric vehicles, such as trolley buses or coaches.

An object of my invention, generally stated, is to provide a control system for an electrically propelled vehicle which shall be simple and efficient in operation and which may be economically manufactured and installed.

A more specific object of my invention is to provide for controlling the dynamic braking of a vehicle by means of dual controllers which are operated in a predetermined sequence.

Another object of my invention is to proportionately divide the dynamic brake between two controllers, which may be pedal operated.

A further object of my invention is to correlate the dynamic brake and the mechanical or fluid brake systems on a vehicle.

Still another object of my invention is to provide for utilizing a current limit relay for dual purposes in a motor control system.

Other objects of my invention will be explained fully hereinafter or will be apparent to those skilled in the art.

In practicing my invention, the dynamic braking is so divided between the power controller and the brake controller that the first application of dynamic braking is obtained when the power controller is returned to its normal or "off" position. The dynamic braking is increased by the initial movement of the air brake pedal or controller, which changes the energization of a coil on a current limit relay, thereby changing the setting of the relay to increase the braking current. The limit relay also functions to de-energize a portion of the control equipment at the end of the accelerating and the braking cycles.

For a fuller understanding of the nature and objects of my invention, reference may be had to the following detailed description, taken in conjunction with the accompanying drawing, in which:

Figure 1 is a diagrammatic view of a control system embodying my invention, and

Fig. 2 is a chart showing the sequence of operation of a portion of the equipment illustrated in Fig. 1.

Referring to the drawing, the system shown therein comprises a motor 10 having an armature winding 11 and a series field winding 12; a line switch LS and a switch M for connecting the motor to power conductors 13 and 14, thereby supplying power to the motor through current collectors 15 and 16, respectively; a pair of switches B1 and B2 for establishing dynamic braking connections for the motor, and a switch H for connecting the field winding 12 across the power conductors 13 and 14 during a portion of the dynamic braking cycle to ensure that the dynamic braking action of the motor builds up quickly.

In order to control the motor current during the accelerating and dynamic braking periods, a resistor R is provided which is shunted from the motor circuit, step-by-step, by means of resistor shunting switches R1, R2, R3, R6, R7 and R8 which are actuated in sequential relation, as shown in the sequence chart in Fig. 2, during both the accelerating and the braking cycles. A pair of field shunting switches F1 and F2 are provided for shunting the field winding 12 through a reactor 17 and a resistor 18 in order to secure maximum speed of the motor 10 in a manner well known in the art.

As shown, the actuating coil of the switch F1 is so connected across the armature 11 when the dynamic braking connections are established that the energization of the coil is proportional to the voltage generated by the armature. Therefore the switch F1 is responsive to the speed of the motor and the operation of the switch is a function of the motor speed. In this manner additional shunting of the field winding is obtained at high motor speeds, thereby reducing the current generated in the armature when dynamic braking is applied during high speed operation.

In order that the sequential operation of the resistor shunting switches may be controlled by interlock progression with a relatively few number of interlocks on these switches, each switch is provided with a closing coil and a holding coil. The closing coil is energized to close the switch after which the holding coil is energized to retain the switch in the closed position, it being unnecessary to maintain the closing coil energized after the holding coil becomes energized.

In accordance with the usual practice, the progression of the resistor shunting switches, both during acceleration and dynamic braking, is automatically controlled by a current limit relay LR, thereby preventing an excessive amount of current flowing through the motor windings. The relay LR is provided with the usual series coil winding 19 which is connected in the armature circuit for the motor 10 and a calibrating winding 20 which is connected across the armature winding 11 of the motor through an interlock 21 on the switch B2 during dynamic braking to change the calibration of the relay LR during the dynamic braking period.

In addition to the windings 19 and 20, the relay LR is also provided with a shunt winding 22 which is energized when the control has completed its sequence of operation, either during the accelerating or the braking cycles. The excitation of the shunt coil 22 causes the limit relay to be held in the open position. The holding of the limit relay in the open position disconnects all the closing coils of the resistor shunting switches and the field shunting switch F2 from the line and only the holding coils remain energized after the control sequence is completed. As is fully described in my copending application Serial No. 347,687, filed July 26, 1940, the energization of the coil 22 is controlled by interlocks provided on the resistor shunting switches and the field shunting switch F2. In this manner the temperature of the closing coils is materially reduced since they are no longer continuously energized and, furthermore, a saving in the energy required to operate the control equipment is effected.

In the present system the coil 22 on the relay LR is also utilized to change the dynamic braking effect of the motor 10. The first application of the dynamic brake is obtained by returning a master controller MC to its normal or "off" position, in which position the dynamic braking connections are established, as will be explained more fully hereinafter. The second application or increase of the dynamic brake is obtained on the initial movement of a brake controller BC which also may be utilized to control the operation of the air brake system (not shown).

When the controller MC is in the braking position, the maximum amount of braking at this position is determined by a resistor 23 which is connected in series circuit relation with the coil 22 on the relay LR when the controller BC is in the "off" position. In this manner the coil 22 is energized from the power conductors 13 and 14 and is accumulative with the series coil 19 on the limit relay, thereby lowering the setting of the relay. The relay in turn governs the amount of braking current permitted to flow by controlling the operation of the resistor shunting switches which shunt the resistor R from the motor circuit.

If it is desired to increase the braking rate, the controller BC is actuated from the "off" position. The initial movement of the controller causes the energizing circuit for the coil 22 to be interrupted. The deenergization of this coil raises the setting of the limit relay which, in turn, permits a higher braking rate. In this manner the dynamic braking is proportionately divided between the power pedal and the brake pedal. Furthermore, the shunt coil 22 on the relay LR is utilized for the dual purposes of deenergizing the closing coils of the resistor shunting switches at the end of the accelerating and the braking cycles, as explained hereinbefore, and for changing the dynamic braking rate during the braking cycle.

As described in my foregoing copending application, dynamic braking, coasting and accelerating or application of power to the vehicle are all controlled by the controller MC which may be of the cam type, and pedal or foot-operated if desired. As shown, the controller MC is so constructed that one portion of the controller is utilized for dynamic braking, another portion for coasting and still another portion for accelerating.

When the controller is actuated from its normal or braking position, it passes through the coasting position, and then through the accelerating positions, the maximum speed of the vehicle being obtained by actuating the controller to the full power position at which time the switch F2 is closed to shunt the field winding of the motor. Beginning at the full power position, the first initial motion of the controller in the backward direction changes the motor from short field to full field. Further movement towards the coasting position begins to insert resistance in series with the motor, thereby softening the shut-off of power. Passing through the coasting position, at which time the motor is disconnected from the power conductors, the first braking point is then obtained. The resistor R is shunted from the motor circuit by the resistor shunting switches, which are under the control of the limit relay LR, thereby maintaining a certain braking rate. If it is desired to increase the braking rate the controller BC is actuated to deenergize the coil 22 on the limit relay, as explained hereinbefore.

In order that the functioning of the foregoing equipment may be more clearly understood the operation of the system will be described in more detail. Assuming that it is desired to accelerate the vehicle at the maximum rate, the controller MC is actuated to its last or full power position. Since it is assumed that the vehicle is starting from standstill, nothing happens as the controller is moved through the braking and coasting positions.

When the first accelerating position is reached the switches LS, R1 and M are closed to connect the motor across the power conductors 13 and 14 in series with the resistor R. The energizing circuit for the closing coil of the switch LS may be traced from the power conductor 13 through the current collector 15, conductor 25, contact members 26 and 27 on the controller MC, conductor 28, an interlock 29 on the switch B1, conductor 31, the actuating coil of the switch LS, conductor 32 and the current collector 16 to the negative conductor 14. The energizing circuit for the switch M extends from the conductor 31 through the actuating coil of the switch M to the negative conductor 32.

Following the closing of the switch LS the closing coil of the switch R1 is energized through a circuit which may be traced from the previously energized conductor 28 through an interlock 33 on the switch LS, conductor 34, an interlock 35 on the switch R7, conductor 36, the closing coil of the switch R1, conductor 37 and the contact members of the relay LR to the negative conductor 32. Following the closing of the switch R1, the holding coil of this switch is energized through a circuit which extends from the conductor 36, through an interlock 38 and the holding coil to the negative conductor 32.

When the controller reaches the second accelerating position the switch R2 is closed to shunt one step of the resistor R from the motor circuit. The energizing circuit for the switch R2 may be traced from the previously energized conductor 36 through an interlock 39 on the switch R1, conductor 41, contact members 42 on the controller MC, conductor 43, the closing coil of the switch R2, conductor 37 and the contact members of the relay LR to the negative conductor 32. The holding coil of the switch R2 is energized through an interlock 44 on the switch when it is actuated to the closed position.

Following the closing of the switch R2, the switches R3, R6, R7 and R8 are closed by interlock progression in a manner well known in the art. As shown in the sequence chart, the switches R1, R2, R3 and R6 are opened upon the closing of the switch R7. Thus the resistor R is connected in the motor circuit in two parallel paths, and the switches R2, R3, R6 and R1 are reclosed in the order shown in the sequence chart to shunt the resistor completely from the motor circuit. Since the operation of the resistor shunting switches by interlock progression under the control of the limit LR is well known in the railway control art, it is believed to be unnecessary to trace all the control circuits for these switches in detail.

As previously explained, the field shunting switch F2 is closed at the end of the accelerating cycle to shunt the field winding 12 through the reactor 17. The energizing circuit for the closing coil of the switch F2 may be traced from the previously energized conductor 34 through contact members 45 of the controller MC, conductor 46, an interlock 47 on the switch R8, conductor 48, an interlock 49 on the switch R1, conductor 51, an interlock 52 on the switch M, conductor 53, the closing coil of the switch F2, conductor 37 and the contact members of the relay LR to their negative conductor 32. The holding coil of the switch F2 is energized through an interlock 55 when the switch is closed.

As explained hereinbefore, the coil 22 of the relay LR is energized at the end of the accelerating cycle to open the contact members of the limit relay, thereby deenergizing the closing coils on the resistor shunting switches and the switch F2. The energizing circuit for the coil 22 may be traced from the previously energized conductor 28 through the interlock 29 on the switch B1, conductor 31, an interlock 56 on the switch F2, conductor 57, a resistor 58, and the coil 22 to the negative conductor 32. In this manner the closing coils are deenergized to prevent overheating of these coils. However, the resistor shunting switches and the field shunting switch F2 are maintained closed by the holding coils during operation of the vehicle. It will be understood that the holding coils require less current than the closing coils since it is only necessary for them to retain the switches in the closed position after they have once been closed by the closing coils.

When it is desired to decelerate the vehicle by means of dynamic braking, the controller MC is returned to the normal or braking position. It will be understood that the motor is disconnected from the power source when the controller is passing through the coasting position since all of the control equipment is deenergized. When the controller reaches the braking position, the switches R1, B1, B2 and H are closed. The switches R1, B1 and B2 establish a dynamic braking circuit for the armature of the motor through the resistor R, and the switch H, in conjunction with the switch B1, connects the field winding 12 of the motor across the power conductors to excite the field winding, thereby causing a rapid build-up of the motor current to assure a quick braking effect.

The energizing circuit for the switch B2 may be traced from the conductor 25 through the contact members 26 and 61 of the controller MC, conductor 62, an interlock 63 on the switch M, conductor 64, interlock 65 on the switch LS, conductor 66 and the actuating coil of the switch B2 to the negative conductor 32. The energizing circuit for the switch B1 extends from the conductor 66 through the coil of the switch to the negative conductor 32.

The energizing circuit for the switch R1 may be traced from the conductor 25 through the contact members 26 of the controller MC, conductor 67, an interlock 68 on the switch B2, conductor 34, the interlock 35 on the switch R7, conductor 36, the closing coil of the switch R1, conductor 37 and the contact members of the relay LR to the negative conductor 32. The energizing circuit for the coil of the switch H extends from the previously energized conductor 66 through an interlock 69 on the switch R8, conductor 71, and the coil of the switch H to the negative conductor 32.

The resistor shunting switches R2, R3, R6, R7 and R8 are closed in the order shown in the sequence chart to shunt the resistor R from the motor circuit in the same manner as during acceleration of the vehicle, the operation of the switches being automatically controlled by the limit relay LR. At this time the coil 22 on the relay LR is energized thereby lowering the setting of the relay. The energizing circuit for the coil 22 may be traced from the power conductor 25 through contact members 26 and 61 of the controller MC, conductor 62, the resistor contact members 72 of the controller BC, conductor 73, the resistor 58 and the coil 22 to the negative conductor 32.

If it is desired to increase the braking rate, the coil 22 is deenergized by actuating the controller BC to the "on" position thereby opening the contact members 72 of this controller. In this manner the setting of the relay LR is raised and the braking current is increased by so controlling the operation of the resistor shunting switches that a higher braking current, and consequently a higher braking rate, is permitted.

As explained hereinbefore, the coil 22 of the relay LR is energized at the end of the braking sequence, that is when the operation of the resistor shunting switches is completed, regardless of whether or not the controller BC has been operated in the foregoing manner to deenergize the coil during the braking cycle. The energizing circuit for the coil 22 at this time may be traced from the previously energized conductor 51 through an interlock 74 on the switch B1, conductor 73, a resistor 58, and the coil 22 to the negative conductor 32. In this manner the relay LR is actuated to its raised position to deenergize the closing coils of the resistor shunting switches, after they have completed their sequence of operation during dynamic braking, in the same manner as during acceleration.

From the foregoing description it is evident that I have provided a control system which makes it possible to so proportion the dynamic braking of a vehicle between the power controller and the air brake controller that a normal braking rate is obtained by operating only the power controller, and the maximum braking rate is obtained by operating the brake controller in conjunction with the power controller. Thus, under normal operating conditions the braking controller is not utilized until it is desired to apply the fluid or mechanical brakes, but under unusual conditions the braking controller may be utilized to increase the dynamic braking rate. Furthermore, the control system is simplified by utilizing the same coil on the limit relay to vary the braking rate and also to operate the relay to deenergize a portion of the control equipment at the end of the operating cycles.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a motor control system, the combination with a motor and a source of power therefor, of switching means for connecting the motor to the power source, additional switching means for establishing dynamic braking connections for the motor, and a controller for controlling the operation of said switching means, said controller being actuated from a normal or braking position through coasting and accelerating positions in sequential relation to accelerate the motor and from an accelerating position through the coasting and braking positions to decelerate the motor by dynamic braking.

2. In a motor control system, the combination with a motor and a source of power therefor, of switching means for connecting the motor to the power source, additional switching means for establishing dynamic braking connections for the motor, a controller for controlling the operation of said switching means, said controller being actuated from a braking position through coasting and accelerating positions in sequential relation to accelerate the motor and from an accelerating position through the coasting and braking positions to decelerate the motor by dynamic braking, and an additional controller for increasing the dynamic braking effect.

3. In a motor control system, the combination with a motor and a source of power therefor, of switching means for connecting the motor to the power source, additional switching means for establishing dynamic braking connections for the motor, a controller for controlling the operation of said switching means, said controller being actuated from a braking position through coasting and accelerating positions in sequential relation to accelerate the motor and from an accelerating position through the coasting and braking positions to decelerate the motor by dynamic braking, and an additional controller cooperating with said first-named controller to increase the dynamic braking effect.

4. In a motor control system, the combination with a motor and a source of power therefor, of switching means for connecting the motor to the power source, additional switch means for establishing dynamic braking connections for the motor, a controller for controlling the operation of said switching means, said controller being actuated from a braking position through coasting and accelerating positions in sequential relation to accelerate the motor and from an accelerating position through the coasting and braking positions to decelerate the motor by dynamic braking, and an additional controller cooperating with said first-named controller to increase the dynamic braking effect said additional controller being operated independently of the first-named controller.

5. In a motor control system, the combination with a motor and a source of power therefor, of switching means for connecting the motor to the power source, additional switching means for establishing dynamic braking connections for the motor, a controller for controlling the operation of said switching means, and an additional controller cooperating with the first-named controller to vary the dynamic braking effect.

6. In a motor control system, the combination with a motor and a source of power therefor, of switching means for connecting the motor to the power source, additional switching means for establishing dynamic braking connections for the motor, a resistor for controlling the motor current, switches for shunting the resistor, relay means for controlling the operation of the resistor shunting switches, a controller for controlling the operation of said switching means, and an additional controller for changing the setting of said relay means to vary the braking effect.

7. In a motor control system, the combination with a motor and a source of power therefor, of switching means for connecting the motor to the power source, additional switching means for establishing dynamic braking connections for the motor, a resistor for controlling the motor current, switches for shunting the resistor, relay means for controlling the operation of the resistor shunting switches, a controller for controlling the operation of said switching means, and an additional controller for changing the setting of said relay means to vary the braking effect, said relay means being disposed to deenergize the operating coils of said resistor shunting switches upon the completion of a sequence of operation.

BASCUM O. AUSTIN.